United States Patent [19]

Suzuki et al.

[11] 4,117,743

[45] Oct. 3, 1978

[54] DEVICE FOR RETAINING TWO ALTERNATE POSITIONS

[75] Inventors: Tetsuro Suzuki; Masaaki Oishi; Itaru Ashida, all of Tokyo, Japan

[73] Assignee: Kabushiki Kaisha Seikosha, Japan

[21] Appl. No.: 788,967

[22] Filed: Apr. 19, 1977

[30] Foreign Application Priority Data

Apr. 19, 1976 [JP] Japan ................................ 51/44320

[51] Int. Cl.² ...................... F16H 31/00; H01H 19/14

[52] U.S. Cl. .......................... 74/577 M; 200/153 LB; 200/156

[58] Field of Search ......... 200/153 R, 153 J, 153 LB, 200/159 R, 340, 328, 156 R; 74/575, 577 M, 577 R

[56] References Cited

U.S. PATENT DOCUMENTS

| | | | |
|---|---|---|---|
| 2,933,578 | 4/1960 | Hubbell et al. | 200/156 |
| 2,965,737 | 12/1960 | Lewis et al. | 200/156 |
| 3,300,611 | 1/1967 | Bury | 200/153 R |
| 3,513,278 | 5/1970 | Elliott | 74/575 |
| 3,559,497 | 2/1971 | Steenackers et al. | 74/577 M |

*Primary Examiner*—William T. Dixson, Jr.
*Attorney, Agent, or Firm*—Robert E. Burns; Emmanuel J. Lobato; Bruce L. Adams

[57] ABSTRACT

An operation member slidably supported on a base plate has opposed pawls which are spaced apart and project toward one another. A position control cam and an integral supplementary cam are rotatably supported on the base between the two pawls. The pawls are disposed on different planes so that a first pawl is engageable with the control cam and the second pawl is engageable with the supplementary cam. The operation member is spring biased in a direction to move the first pawl toward the position control cam. The position control cam is provided alternately with deep concaves and shallow concaves. When the first pawl of the operation member engages in a deep concave it is in one position. When it engages a shallow concave it is in a second position. The supplementary cam has teeth at positions corresponding to the concaves of the position control cam. When the operation member is slidably moved in a direction opposite to the spring bias, the second pawl engages a tooth of the supplementary cam so as to rotate the supplementary cam and the position control cam to a new position. For example starting with the first pawl in a deep concave, sliding the operation member against the bias spring causes the second pawl to engage a tooth of the supplementary cam and thereby rotate the cams so that when the operation member is released the first pawl engages in a shallow concave of the position control cam and the operation member is thus in a different position.

3 Claims, 6 Drawing Figures

DEVICE FOR RETAINING TWO ALTERNATE POSITIONS

FIELD OF INVENTION

The present invention relates to a device for retaining a member in two alternate positions by successive pushing operations. A device of this kind is useful, for example, as an alarm stop mechanism or a switch.

SUMMARY OF THE INVENTION

It is an object of the present invention to provide a device for retaining an operating member in two alternate positions which is simple and rugged in construction and reliable and precise in its operation. In accordance with the invention an operating member which is slidably supported on a base plate for linear movement in a selected direction has two opposed pawls which are spaced apart and project toward one another in the direction of movement of the operating member. A position control cam and an integral supplementary cam are rotatably mounted on the base plate between the two pawls which are located in different planes so that a first pawl is engageable with the position control cam and the second pawl is engageable with the supplementary cam. The position control cam has in its periphery deep concaves and shallow concaves alternately disposed and the supplementary cam has teeth at positions corresponding to the concaves of the position control cam. The operating member is spring biased so as to bring the first pawl into engagement with one or another of the concaves of the position control cam. When the first pawl is in engagement with a deep concave the operating member is retained in one position and when the first pawl is in engagement in a shallow concave the operating member is retained in a second position. When the operating member is moved in a direction opposite to its bias, the second pawl engages one or another of the teeth of the supplementary cam so as to rotate the cams and thereby bring the next succeeding concave of the position control cam into position to be engaged by the first pawl when the operating member is released. Thus when the operating member is successively pushed the cams are indexed so as to bring the deep concaves and the shallow concaves alternately into position for engagement by the first pawl.

BRIEF DESCRIPTION OF DRAWINGS

The nature, objects and advantages of the invention will be more fully understood from the following description of a preferred embodiment shown by way of the example in the accompanying drawings in which.

DESCRIPTION OF PREFERRED EMBODIMENT

Figure 1:
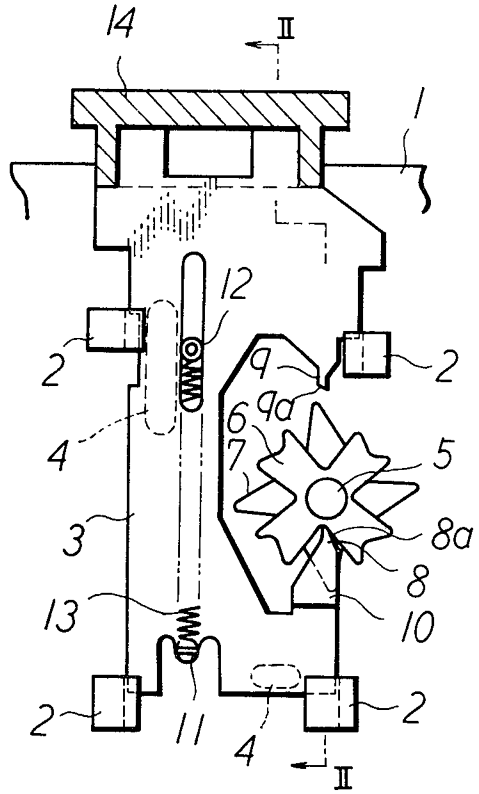
FIG. 1 is an elevational view of a device for retaining a member alternately in two positions in accordance with the invention.
Figure 2:
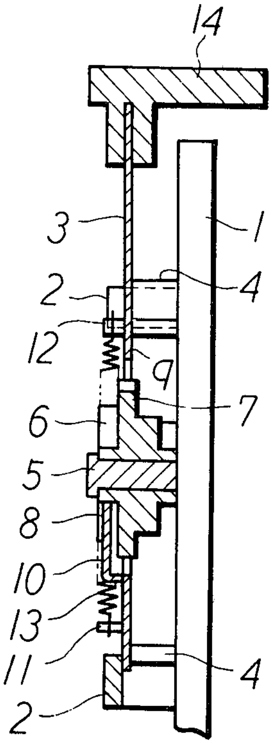
FIG. 2 is a vertical section taken on the lines II—II in FIG. 1.

In the embodiment of the invention shown by way of example in the drawings an operating member 3 is slidably supported by four guides 2 on a base plate 1. The operating member 3 is kept spaced from the base plate by a predetermined distance by projections 4 on the base plate 1. The base plate is provided with a shaft 5 about which a position control cam 6 and an integral supplementary cam 7 are rotatably supported. The operating member 3 is provided with a lower pawl 8 confronting the position control cam 6 and an upper pawl 9 confronting the supplementary cam 7. The pawls 8 and 9 are spaced apart and project toward one another on opposite sides of the cams 6, 7. The lower pawl 8 is formed on a raised portion 10 of the operating member 3 so that the pawl 8 and the pawl 9 are located in different planes. Therefore, the pawl 8 is engageable only with the position control cam 6 and the pawl 9 is engageable only with the supplementary cam 7. The pawls 8 and 9 are respectively provided with slope portions **8*a* and 9*a* at the sides in the direction of rotation of the cams 6 and 7** so that engagement at a deadpoint may not occur.

Figure 3:
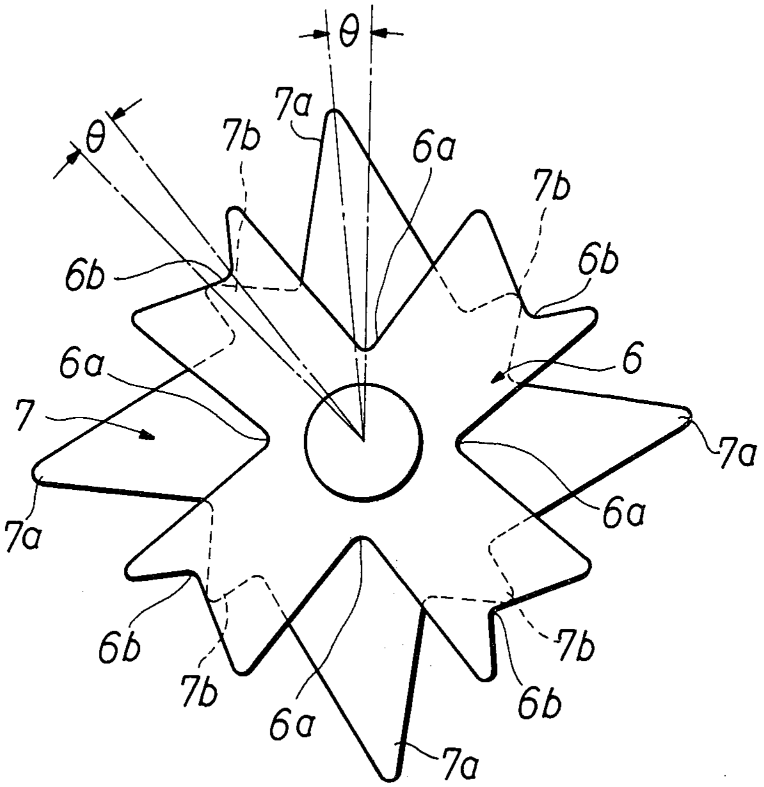
FIG. 3 is an enlarged elevation of the position control cam and the supplementary cam.

Referring to FIG. 3, the position control cam 6 is provided with four deep concaves **6*a* spaced 90° apart and four shallow concaves 6*b* intermediate the deep concaves 6*a* and hence also spaced at an angle of 90° to one another. The supplementary cam 7 is provided with four large teeth 7*a* at positions corresponding to the deep concaves 6*a* of the position control cam 6 and four small teeth 7*b* at positions corresponding to the shallow concaves of the position control cam. The teeth 7*a* and 7*b* of the supplementary cam 7 are angularly displaced counterclockwise by an angle of $\theta$ from the respective concaves 6*a* and 6*b* of the position control cam 6 in order to avoid engagement at a deadpoint between the pawl 9 and the teeth 7*a* or 7*b***. In the present embodiment the angle $\theta$ is approximately 6° although the angle is not restricted to this value.

A coil tension spring 13 is connected at opposite ends to a hook 11 on the operating member 3 and a pin 12 on a base plate. The hook 11 is formed by a tab portion at the lower end of the operating member 3 bent up at right angle. The pin 12 projects from the base plate through a guide hole **3*a* provided in the operating member 3. The operating member 3 is thus biased upwardly by the spring 13 so as to bring the lower pawl 8 into engagement with the position control cam 6. Therefore, the operating member 3 is normally retained in position with the lower pawl 8 engaged in a deep concave 6*a* or a shallow concave 6*b* of the position control cam 6. A push-button 14 is provided at the top end portion of the operating member 3 so as to move the operating member downwardly against the bias of the spring 13**.

Figure 4:
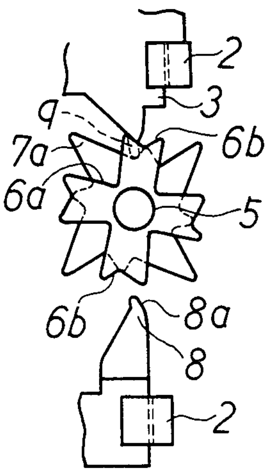
FIG. 4, 5 and 6 are explanatory views illustrating operation of the device.
Figure 5:
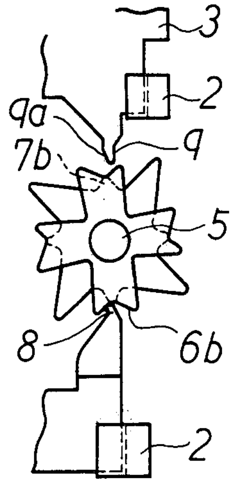

The operation of the embodiment illustrated in the drawings will now be described with reference to FIGS. 1, 4, 5 and 6. In the state illustrated in FIG. 1 the lower pawl 8 abuts against a deep concave **6*a* of the position control cam 6 by the pull of the coil spring 13 and the operating member 3 is thereby retained in upper position. The large tooth 7*a* of the supplementary cam 7 is displaced a little in the direction of rotation with respect to the upper pawl 9. When the operating member 3 is pushed downwardly by the push button 14 against the bias of the spring 13, the pawl 9 engages the slope on the right side of the large tooth 7*a* of the supplementary cam 7. Thus the supplementary cam 7 and the position control cam 6 are rotated counterclockwise until the downward movement of the operating member 3 is stopped by engagement of its pawl 9 with the concave between the large tooth 7*a* and the small tooth 7*b* of the supplementary cam 7 as shown in FIG. 4. In the state of FIG. 4 the lower pawl 8 faces the shallow concave 6*b* of the position control cam 6. Upon release of the push button 14, the operating member 3 is raised upwardly by the pull of the spring 13 and is retained in its lower position with the pawl 8** abutting against the shallow concave *6b* of the position control cam 6, as shown in FIG. 5. During this operation the position control cam 6 and the supplementary cam 7 are rotated a little in a counterclockwise direction so that the pawl 9 faces the small tooth *7b* which is displaced a little to the left of the pawl 9.

Figure 6:
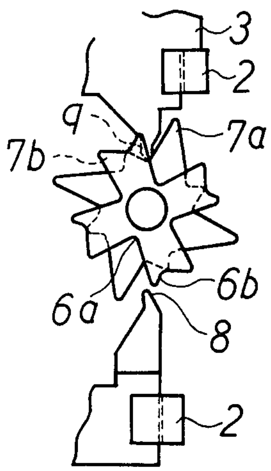

When the button 14 is pushed again the operating member 3 descends with its pawl 9 pushing the right side slope of the small tooth *7b* of the supplementary cam 7. The supplementary cam 7 and the position control cam 6 are thereby rotated together by a predetermined angle in the counterclockwise direction, as shown in FIG. 6. In this state the lower pawl 8 faces the deep concave *7a* of the position control cam 6. When the button 14 is released the operating member 3 is restored to its upper position by pull of the spring 13. The pawl 8 rotates the position control cam 6 in a counterclockwise direction until it abuts against the bottom of the deep concave *6a*, as shown in FIG. 1. Thus the operating member 3 is retained in its upper position.

In this manner, as the depressing and releasing of the push button 14 is repeated the operating member 3 is retained alternately in its upper and lower positions.

As explained above according to the present invention the operating member is retained in its upper or lower position by means of a simple structure. Since the teeth of the supplementary cam are spaced angularly in the rotational direction with respect to the corresponding concaves of the position control cam a deadpoint does not occur and the operation of the device is thus easy and precise.

While a preferred embodiment of the invention has been illustrated by way of example in the drawings and is herein particularly described, it will be understood that many variations and modifications may be made and that hence the invention is in no way limited to the illustrated embodiments.

What is claimed is:

1. A device for retaining a member in two alternate positions comprising a base plate, an operating member slidably supported on said base plate for reciprocatory movement in a selected direction and having two opposed pawls which are spaced apart and project toward one another in the direction of movement of said operating member, a position control cam and an integral supplementary cam rotatably mounted on said base plate between said pawls, said pawls being in different planes so that a first pawl is engageable with said position control cam and a second pawl is engageable with said supplementary cam, said position control cam having in its periphery deep concaves and shallow concaves alternately disposed and said supplementary cam having teeth at positions corresponding to the concaves of said position control cam, means biasing siad operating member in a direction to bring said first pawl of said operating member alternately into engagement in said deep concaves and said shallow concaves of said position control cam and said second pawl being engageable with said teeth of said supplementary cam upon movement of said operating member in a direction opposite to said bias to index said supplementary cam and said position control cam to bring a succeeding cavity of said position control cam into position to be engaged by said first pawl upon return movement by said biasing means, said operating member being positioned in one position when said first pawl is in engagement in a deep concave of said position control cam and in a second position when said first pawl is in engagement in a shallow concave of said control cam.

2. A device according to claim 1, wherein the teeth of said supplementary cam are slightly displaced relative to the concaves of said position control cam in the direction of rotation of said cams.

3. A device according to claim 1, wherein said supplementary cam is provided with large teeth at positions corresponding to the deep concaves of said position control cam and with small teeth at positions corresponding to the shallow concaves of said position control cam.

* * * * *